United States Patent [19]
Hensel et al.

[11] Patent Number: 5,867,460
[45] Date of Patent: Feb. 2, 1999

[54] APPARATUS FOR LASER BEAM EXPOSURE OF A SUBSTRATE DISC

[75] Inventors: Bernd Hensel, Eschborn; Friedrich Hofmann, Büdingen; Hermann Koop, Ronnenberg; Paul Kaiser; Eberhard Feick, both of Müchen; Franz Richter, Eichenau, all of Germany

[73] Assignee: Balzers und Leybold Deutschland Holding AG, Hanau, Germany

[21] Appl. No.: 827,477

[22] Filed: Oct. 4, 1996

[51] Int. Cl.⁶ ........................................... G11B 7/00
[52] U.S. Cl. ........................... 369/44.11; 369/44.15
[58] Field of Search ................... 369/43, 44.11, 369/44.12, 44.14, 44.15, 112, 100; 360/107, 109

[56] References Cited

U.S. PATENT DOCUMENTS

| | | | |
|---|---|---|---|
| 4,375,091 | 2/1983 | Dakin et al. | 369/32 |
| 4,385,373 | 5/1983 | Howe | 369/44.15 |
| 4,794,581 | 12/1988 | Andresen | 369/44.15 |

FOREIGN PATENT DOCUMENTS

| | | | |
|---|---|---|---|
| 0002547 | 6/1979 | European Pat. Off. | G11B 7/08 |
| 0553664 | 8/1993 | European Pat. Off. | G11B 25/04 |

OTHER PUBLICATIONS

EPO Patent Abstracts of Japan; Title: Optical Head; Publ No 60211642; Publ Date Oct. 24, 1985; Appln No. 59066653; Appln Date Apr. 5, 1984; Applicant: NEC Corp.; Inventor Ishikawa Tsutomu.

Primary Examiner—Paul W. Huber
Attorney, Agent, or Firm—Felfe & Lynch

[57] ABSTRACT

In an apparatus for the laser beam exposure of a substrate disc (5), linked block tables (19, 29) are provided, which have each a piezotranslator (24, 31). This makes it possible to perform a fine correction of the movements very rapidly and very precisely.

6 Claims, 3 Drawing Sheets

APPARATUS FOR LASER BEAM EXPOSURE OF A SUBSTRATE DISC

BACKGROUND OF THE INVENTION

The invention relates to an apparatus for exposing a substrate disc to a laser beam, which has a laser beam objective lens disposed in a mounting for displacement by means of piezoelectric translators, and a slide transversely displaceable in a table by means of a radial drive, the slide having a substrate holder disposed on a spindle driven by a rotary drive.

For the manufacture of master discs by which optically readable information media, such as compact discs, are produced, it is necessary that pits corresponding to the digital data be placed by the laser beam in precisely defined positions on a spiral track of a master disc. For this purpose, in addition to a precisely controlled rotary speed, a very precise movement of the slide relative to the objective is necessary. Furthermore, it is necessary in the manufacture of such master discs to form a defined focal point, i.e., a light spot, on the photoresist coating of the substrate, with a defined spot diameter. This is accomplished with fixedly set end lens only if the substrate—usually a glass plate in practice—has always the same thickness and is absolutely flat at its surface. As a rule, the substrate thicknesses vary in the nanometer range, while the irregularities are in the micron range. This results in different distances between the lens and the substrate surface and thus to a variation of the laser spot diameter on the substrate. To prevent this it is known to adjust the end lens of the laser beam objective automatically by means of a moving-coil drive in accord with the varying distances. It has been found, however, that such drives do not have a sufficient dynamic range, so that irregulatories cannot be compensated due to excessively slow control, and therefore spot errors occur. This is true especially when operating at comparatively high recording velocities. In such a system, then, only substrates having very flat surfaces can be used, which are expensive to produce. Even then, recording speeds above 3 are not possible.

DE-A-38 28 145 has disclosed an apparatus for laser beam exposure of a substrate disc, in which the laser beam objective is mounted at the free end of a swiveling scanner arm. For focus control, a piezotranslator is disposed on the scanner arm, by which the scanner arm is able to execute a swiveling movement varying with the distance of the laser beam objective from the substrate. An additional piezotranslator can swivel the to scanner arm in a plane at right angles thereto, which serves for the rapid track following readjustment or correction in the direction of the track.

It is a disadvantage of the known apparatus that the adjustments produced by the piezotranslators result in an arcuate movement of the laser beam objective. This results in inaccuracies which limit the performance of the apparatus.

U.S. Pat. No. 4,385,373 discloses an apparatus for laser beam exposure in which the laser beam objective is held in a frame of four memory-like piezo elements configured as flexural bodies. By the simultaneous actuation of all of the piezo elements, the latter can flex and thereby adjust the distance of the laser beam objective from the substrate.

The focal adjustment explained in this patent has the disadvantage that the varying flexing of the piezo elements results in a tilting of the laser beam objective lens. Since necessarily not all piezo elements have an absolute identical behavior, such tilting movements can never be entirely prevented, so that, again, the accuracy of the focal adjustment leaves something to be desired, although the four piezo elements would involve great cost in achieving rapid adjusting movements.

SUMMARY OF THE INVENTION

The object of the invention is for the laser beam objective to execute fast and precise adjusting motions, so that master discs can be produced at high speed and data densities.

According to the invention, fine adjustment of the laser beam objective relative to the direction of movement of the slide and/or fine focusing of the laser beam objective is accomplished by the piezotranslators provided on a linked block table which is configured for the linear displacement of the laser beam objective by a piezotranslator in only one direction, and for the linear displacement of the laser beam objective in a direction at right angles thereto and in line with the optical axis of the laser beam objective.

In such an apparatus the linked block table forms a cross slide, such as the one familiar especially in lathes, which permits very precise adjusting movements for focusing and for correcting the tracing of the track. Thus, the apparatus of the invention makes possible a high recording speed and great data density at relatively low cost. The linked block table results in a high accuracy of guidance, so that the precise length changes of each piezotranslator can be converted to precise adjusting movements.

In an embodiment that is especially simple in design and very rigid, the linked block table has a frame which is to be fastened to a component and in which an internal part connected by links is disposed for displacement by the one piezotranslator in the one direction, and the internal part is fixedly attached to an internal part o a second linked block table which likewise has a frame which is disposed on the internal part for displacement by an additional piezotranslator in the other direction.

For further simplification of the design it is helpful if the piezotranslator is supported against the frame on the one hand and on the other hand against the internal part, and if the internal part is biased by a compression spring against the piezotranslator.

Tilting forces leading to adjustment errors can be excluded in a simple manner if, according to another embodiment of the invention, the piezotranslator thrusts through the medium of a ball against the frame and internal part, and the compression spring likewise thrusts via a ball against the internal part.

The linked block table is made especially compact if the internal part has a blind hole which the piezotranslator engages.

The correction of the position of the laser beam objective relative to the slide and thus relative to the substrate can be accomplished in a simple manner if, to determine the position of the slide relative to the laser beam objective, a measuring device with a scale is provided on the table and a sensor on the slide, and if means are provided for the modulation of the piezotranslator performing the horizontal displacement of the laser beam objective according to the signals of the sensor.

DETAILED DESCRIPTION OF THE PREFERRED EMBODIMENT

Figure 1:
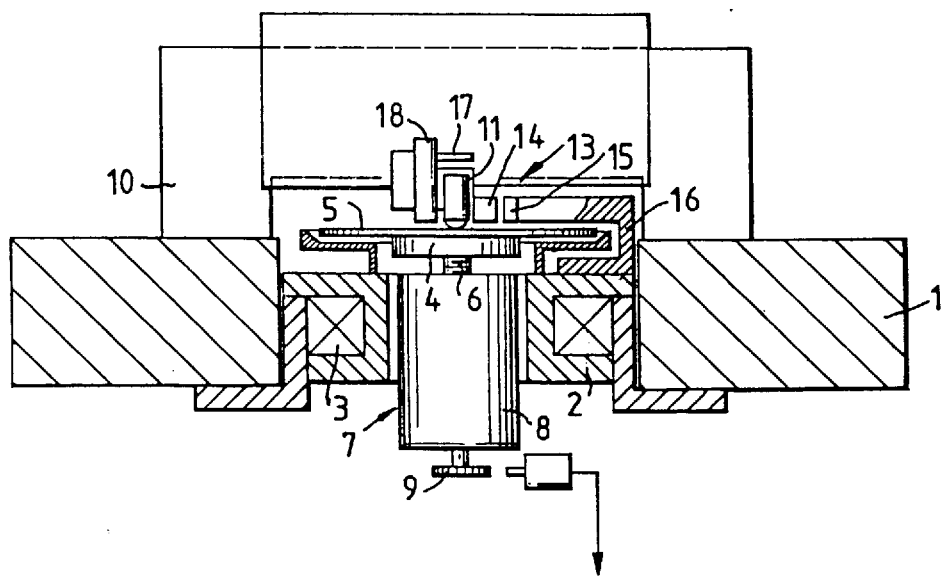
FIG. 1 is a side view of a preferred embodiment of an apparatus according to the invention.

FIG. 1 shows a table 1 in which a slide 2 can be displaced on air bearings 3 transversely of the plane of drawing. The slide 2 has a substrate holder 4 on which a substrate 5 serving as a master disc is held by suction. The substrate holder 4 is provided on the upper end of a spindle 6 which in turn is held for rotation in an air bearing, not shown, of the slide 2. A rotary drive 7 with a motor 8 serves for driving the spindle 6 and thus the substrate holder 4, and it is flange-mounted together with a rotary pulse generator 9 to the bottom end of the spindle 6. A bridge 10 holding a laser beam objective 11 spans the table 1.

Figure 2:
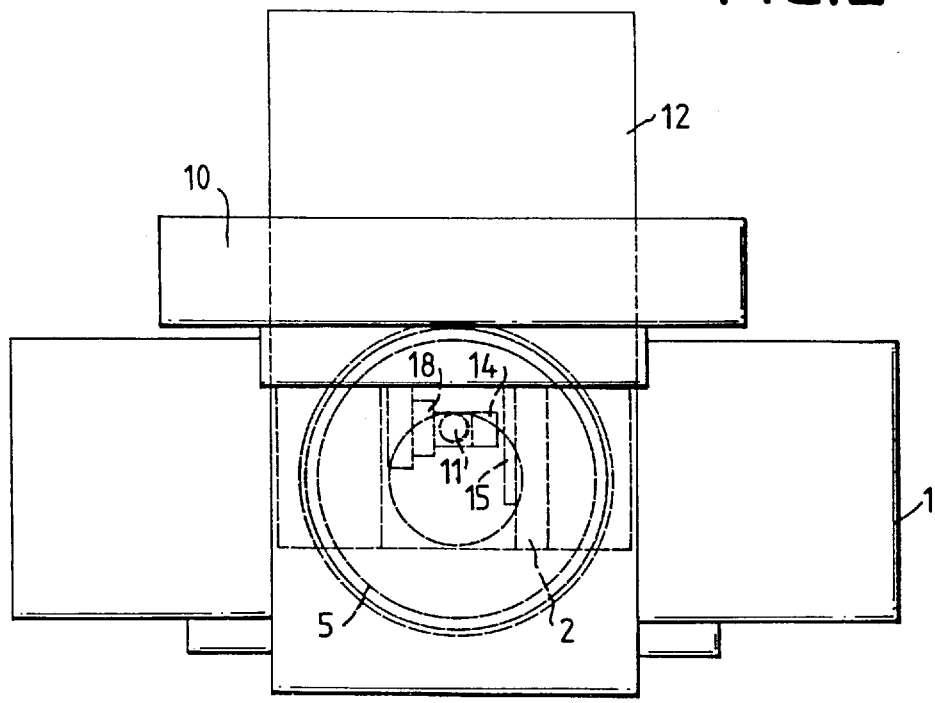
FIG. 2 is a plan view of the apparatus.

A radial drive 12 indicated in FIG. 2 serves to drive the slide 2. When the latter is working, the substrate 5 moves transversely of the laser beam objective 11, so that, due to the simultaneous rotation of the substrate holder 4 with the substrate 5, pits can be exposed on a spiral track on the substrate 5.

A measuring device 13 has a sensor 14 fastened as closely as possible to the objective, and a scale 15 fastened on the table and aligned in the direction of movement of the table 1. In FIG. 1 can be seen a channel-shaped member 16 which reaches across the substrate and assures that the scale 15 runs immediately in front of the sensor 14.

The objective 11 is carried by a holder 17 which has a linear actuator 18 with a piezotranslator. This makes it possible to produce slight adjusting movements of the objective 11 on the axis of movement of the table 1.

FIG. 2 shows especially the alignment of the scale 15 in the direction of movement of the slide 2. In this manner, precise data on the position of the slide 2 relative to the laser beam objective 11 can constantly be obtained with the sensor 14. If, due to Inaccuracies of the radial drive 12, the data differ from the target data, the position is corrected by means of the actuator 18 by shifting the laser beam objective 11.

Figure 3:
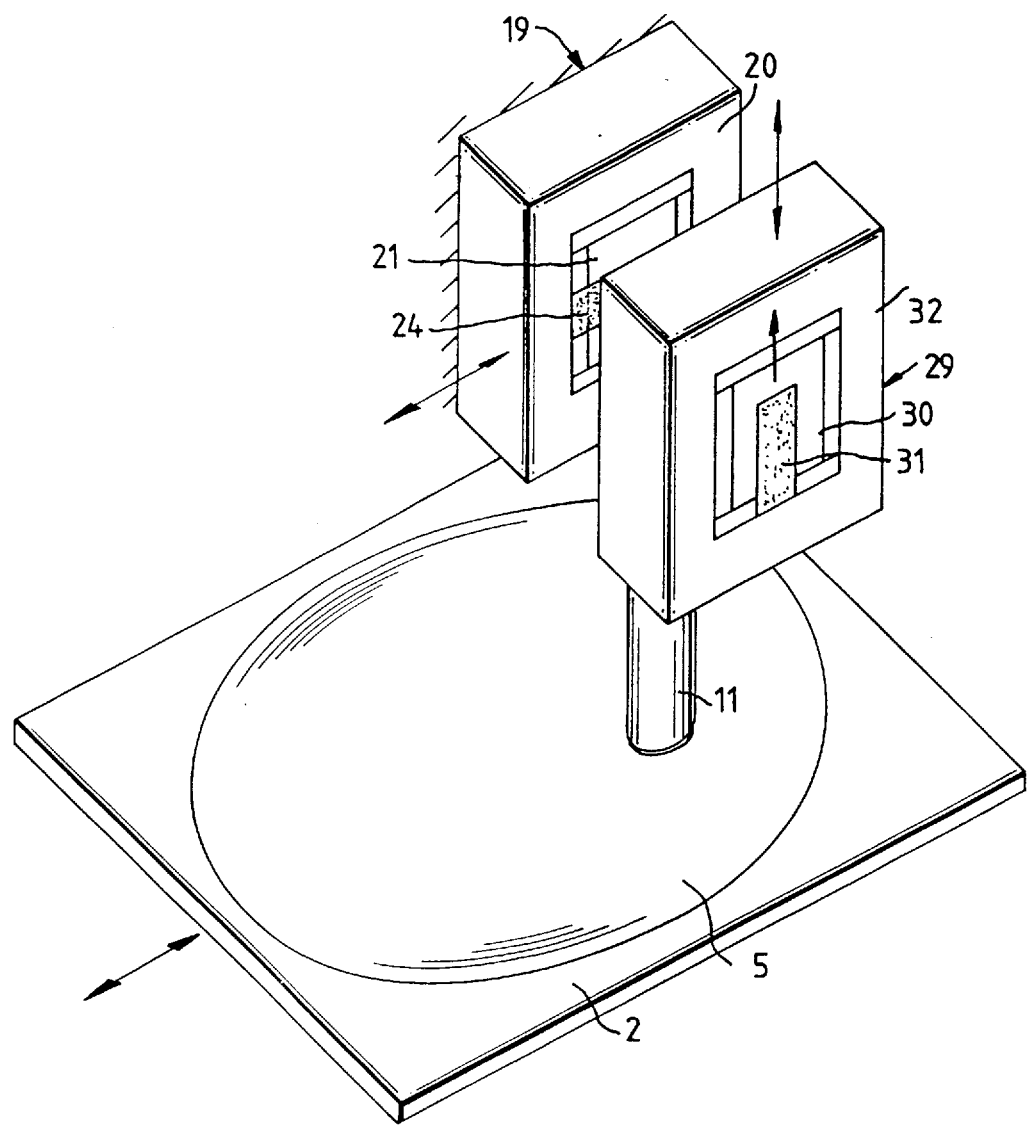
FIG. 3 is a perspective view of a linked block table with adjacent components.

FIG. 3 shows two interconnected linked block tables 19 and 29. The linked block table 19 is fixedly attached to the bridge 10 shown in FIG. 1. It has an internal part 21 which can be displaced relative to a frame 20 by a piezotranslator 24 in a horizontal plane. The internal part 21 is affixed to the internal part 30 of the second linked block table 29 and, by means of a piezotranslator 31, can shift a frame 32 in the vertical direction. This frame 32 bears the laser beam objective 11 shown in FIG. 1, which serves to expose the substrate 5 to the laser beam.

Figure 4:
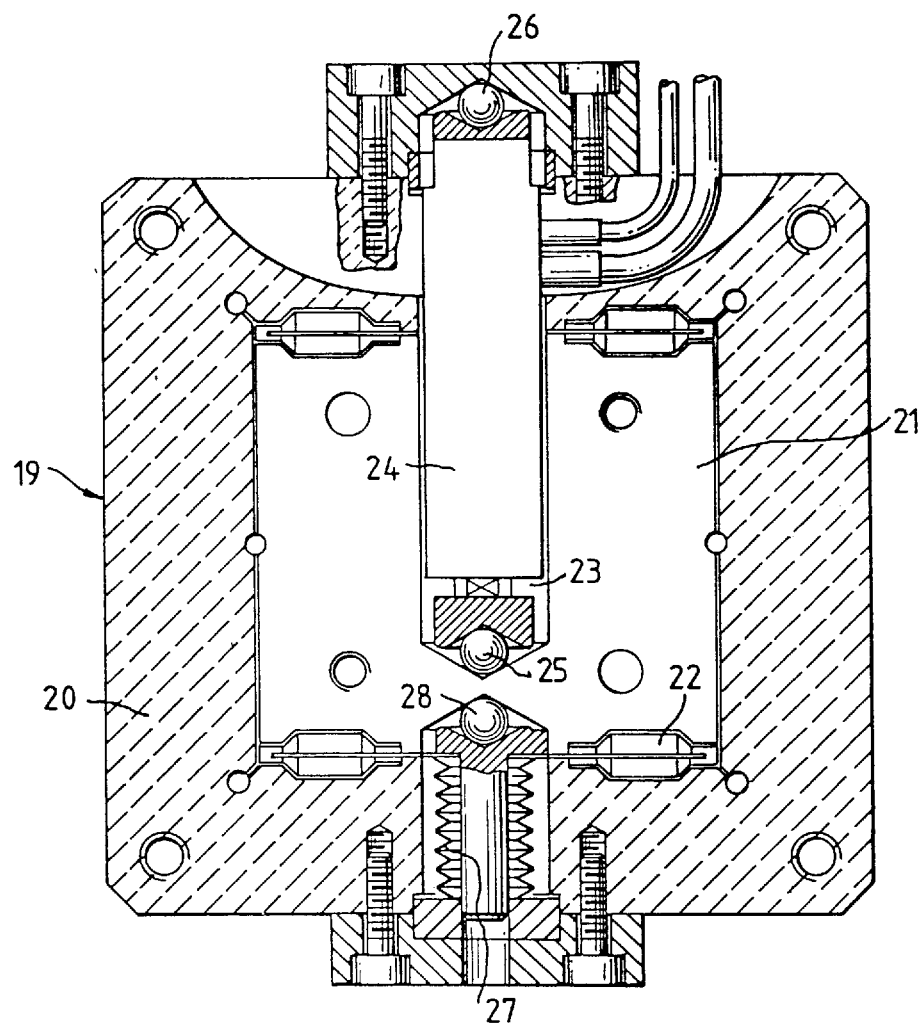
FIG. 4 is a section taken through a piezotranslator according to the invention.

FIG. 4 shows a section through a linked block table 19. It consists of the above-mentioned continuous frame 20 and the internal part 21 which is displaceable to a limited degree therein. This internal part 21 is connected to the frame 20 by four schematically indicated links 22. The internal part 21 has a blind hole 23 into which a piezotranslator 24 composed of individual piezoelectric elements, and which thrusts through a ball 25 against the bottom of the blind hole 23 and with a ball 26 against the frame 20 or a component affixed to the latter.

In the bottom portion of FIG. 4 can be seen a compression spring 27 which thrusts against the frame 20 at one end and at the other end thrusts through a ball 28 against the interior part 21 and thereby biases the internal part 21 against the piezotranslator 24.

If the piezotranslator 24 is subjected to different tensions, it changes its length in the nanometer range and therefore displaces the internal part 21 relative to the frame 20. If, for example, the frame 20 is fixed and the internal part 21 is connected to the laser beam objective 11, then in this manner slight adjusting movements of the laser beam objective 11 can be produced.

We claim:

1. Apparatus for the laser beam exposure of a substrate disk, which has a laser beam objective disposed for adjustment in a mounting by means of piezotranslators, and a slide which can be driven transversely thereto in a table by means of a radial drive and which has a substrate holder disposed on a spindle which can be driven by a rotary drive, wherein for the fine adjustment of the laser beam objective (11) relative to the direction of movement of the slide (2) and/or for the fine focusing of the laser beam objective (11), the piezotranslators (24, 31) are provided on a linked block table (19) which is configured for the linear displacement of the laser beam objective (11) by a piezotranslator (24) exclusively in one direction and for the linear displacement of the laser beam objective (11) in a direction at right angles thereto in line with the optical axis of the laser beam objective (11).

2. Apparatus according to claim 1, wherein the linked block table (19) has a frame (20) to be fastened to a component, and in said frame a first internal part (21) connected by links (22) is disposed for displacement by the one piezotranslator (24) in the one direction, the internal part (21) being affixed to a second internal part (30) of a second linked block table (29) which has a frame (32) disposed on the second internal part for displacement by an additional piezotranslator (31) in the other direction.

3. Apparatus according to claim 2, wherein the piezotranslator (24, 31) is thrust on the one hand against the frame (20, 32), and on the other hand against the internal part (21, 30), and that the internal part (21, 30) is biased by a compression spring (27) against the piezotranslator (24, 31).

4. Apparatus according to claim 3, wherein the piezotranslators (24, 32) thrust each with the interposition of a ball (25, 36) against the frame (20, 32) and against the internal part (21, 30) and the compression springs likewise thrust through a ball (28) against the internal part (21, 30).

5. Apparatus according to claim 2 wherein at least one of said internal parts (21, 30) has a blind hole (23) into which the piezotranslator (24, 31) reaches.

6. Apparatus according to claim 1 wherein for the determination of the position of the slide (2) relative to the laser beam objective (11) a measuring device (13) with a scale (15) is provided on the table (1), and a sensor (14) on the slide (2), and that means are provided for controlling the piezotranslator (24) that brings about the horizontal displacement of the laser beam objective in accord with the signals of the sensor (14).

* * * * *